United States Patent
Nelurouth et al.

(10) Patent No.: US 11,832,344 B2
(45) Date of Patent: Nov. 28, 2023

(54) PERSONALIZATION ON MULTI-SUBSCRIBER IDENTIFICATION MODULE DEVICES

(71) Applicant: QUALCOMM Incorporated, San Diego, CA (US)

(72) Inventors: Rajendra Prasad Nelurouth, Hyderabad (IN); Venkata Durga Vinod Chikkala, Hyderabad (IN); Bhanu Prakash Chouhan, Hyderabad (IN); Tauseef Ahmad Qidwai, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 231 days.

(21) Appl. No.: 17/460,015

(22) Filed: Aug. 27, 2021

(65) Prior Publication Data

US 2023/0063512 A1    Mar. 2, 2023

(51) Int. Cl.
*H04W 12/45* (2021.01)
*H04W 8/18* (2009.01)
*H04W 76/15* (2018.01)

(52) U.S. Cl.
CPC .......... *H04W 8/183* (2013.01); *H04W 12/45* (2021.01); *H04W 76/15* (2018.02)

(58) Field of Classification Search
CPC ..... H04W 8/183; H04W 12/45; H04W 76/15; H04W 8/18; H04W 48/18; H04W 88/06; H04W 88/02; H04W 12/08; H04W 12/48; H04W 4/60; H04M 3/387
See application file for complete search history.

(56) References Cited

U.S. PATENT DOCUMENTS

| | | | |
|---|---|---|---|
| 9,385,772 B1* | 7/2016 | Sekuru ................ | H04B 1/3816 |
| 10,820,188 B2* | 10/2020 | Kim ..................... | H04W 76/30 |
| 2014/0228039 A1* | 8/2014 | Zhao .................... | H04B 1/3816 |
| | | | 455/458 |

(Continued)

FOREIGN PATENT DOCUMENTS

EP    3735011 A1    11/2020

OTHER PUBLICATIONS

International Search Report and Written Opinion—PCT/US2022/040173—ISA/EPO—dated Nov. 14, 2022.

*Primary Examiner* — Andrew Wendell
(74) *Attorney, Agent, or Firm* — Alan Gordon

(57) ABSTRACT

Methods, systems, and devices for wireless communications are described. An example method may include identifying that a user equipment (UE) includes a first subscriber identification module (SIM) card in a first card slot of a plurality of card slots of the UE is associated with a first operator and associated with a first subscription for which use of the UE is subject to a contractual obligation to the first operator. The method may further include determining that the UE is in communication with a first radio access network of the first operator and communicating in accordance with a second subscription associated with a second SIM card in a second card slot, the communicating allowed based at least in part on the first SIM card associated with the first operator being in the first card slot and the UE being in communication with the first radio access network.

26 Claims, 11 Drawing Sheets

(56) References Cited

U.S. PATENT DOCUMENTS

| | | | | |
|---|---|---|---|---|
| 2015/0004973 | A1* | 1/2015 | Gude | H04W 52/0216 |
| | | | | 455/435.2 |
| 2015/0099516 | A1* | 4/2015 | Nayak | H04W 52/0229 |
| | | | | 455/435.2 |
| 2016/0219648 | A1* | 7/2016 | Awoniyi-Oteri | H04W 8/24 |
| 2016/0255639 | A1* | 9/2016 | Chen | H04W 72/542 |
| | | | | 370/336 |
| 2017/0208603 | A1* | 7/2017 | Goel | H04W 36/14 |
| 2017/0230515 | A1 | 8/2017 | Velusamy et al. | |
| 2020/0404483 | A1* | 12/2020 | Qiang | H04W 12/72 |
| 2022/0022201 | A1* | 1/2022 | Mellqvist | H04W 88/06 |
| 2022/0182812 | A1* | 6/2022 | Sevindik | H04W 8/183 |

* cited by examiner

PERSONALIZATION ON MULTI-SUBSCRIBER IDENTIFICATION MODULE DEVICES

FIELD OF TECHNOLOGY

The following relates to wireless communications, including personalization on multi-subscriber identification module devices.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may include a card slot for a subscriber identification module (SIM) card. A SIM card may be smart card that stores data, such as a unique identification number, a phone number, subscription information, and other data. A UE may communicate over a radio access network using a subscription with a network operator or cellular provider via a SIM card. Some UEs have more than one SIM card slot, which may enable the UE to have SIM cards from more than one network operator or cellular provider.

SUMMARY

The described techniques relate to improved methods, systems, devices, and apparatuses that support personalization on multi-subscriber identification module devices. Generally, the described techniques provide for disabling SIM card slots and subscriptions with other operators when specific networks are not enabled by a first operator that subsidized the SIM device. A UE may determine whether there is a valid SIM card in any slot that is associated with the first operator. If not, no other SIM card slot may be used. If there is a valid SIM card associated with the first operator, the UE may determine which networks have valid subscriptions with the first operator. Other SIM cards in other slots may only be able to camp on networks that have valid subscriptions with the first operator.

A method for wireless communication at a user equipment (UE) is described. The method may include identifying that the UE includes a first subscriber identification module card associated with a first operator, the first subscriber identification module card being in a first card slot of a set of multiple card slots of the UE and associated with a first subscription for which use of the UE is subject to a contractual obligation to the first operator. The method may include determining that the UE is in communication with a first radio access network of the first operator. The method may also include communicating in accordance with a second subscription associated with a second subscriber identification module card in a second card slot of the set of multiple card slots, the communicating allowed based on the first subscriber identification module card associated with the first operator being in the first card slot and the UE being in communication with the first radio access network.

An apparatus for wireless communication at a UE is described. The apparatus may include a processor, memory coupled with the processor, and instructions stored in the memory. The instructions may be executable by the processor to cause the apparatus to identify that the UE includes a first subscriber identification module card associated with a first operator, the first subscriber identification module card being in a first card slot of a set of multiple card slots of the UE and associated with a first subscription for which use of the UE is subject to a contractual obligation to the first operator. The instructions may be executable by the processor to cause the apparatus to determine that the UE is in communication with a first radio access network of the first operator, and communicate in accordance with a second subscription associated with a second subscriber identification module card in a second card slot of the set of multiple card slots, the communicating allowed based on the first subscriber identification module card associated with the first operator being in the first card slot and the UE being in communication with the first radio access network.

Another apparatus for wireless communication at a UE is described. The apparatus may include means for identifying that the UE includes a first subscriber identification module card associated with a first operator, the first subscriber identification module card being in a first card slot of a set of multiple card slots of the UE and associated with a first subscription for which use of the UE is subject to a contractual obligation to the first operator, means for determining that the UE is in communication with a first radio access network of the first operator, and means for communicating in accordance with a second subscription associated with a second subscriber identification module card in a second card slot of the set of multiple card slots, the communicating allowed based on the first subscriber identification module card associated with the first operator being in the first card slot and the UE being in communication with the first radio access network.

A non-transitory computer-readable medium storing code for wireless communication at a UE is described. The code may include instructions executable by a processor to identify that the UE includes a first subscriber identification module card associated with a first operator, the first subscriber identification module card being in a first card slot of a set of multiple card slots of the UE and associated with a first subscription for which use of the UE is subject to a contractual obligation to the first operator, determine that the UE is in communication with a first radio access network of the first operator, and communicate in accordance with a second subscription associated with a second subscriber identification module card in a second card slot of the set of multiple card slots, the communicating allowed based on the first subscriber identification module card associated with the first operator being in the first card slot and the UE being in communication with the first radio access network.

Some examples of the method, apparatuses, and non-transitory computer-readable medium described herein may further include operations, features, means, or instructions for determining whether the first subscription may be valid for communications with the first radio access network of the first operator, where the communicating in accordance with the second subscription associated with the second subscriber identification module card may be based on the first subscription being valid.

In some examples of the method, apparatuses, and non-transitory computer-readable medium described herein, determining whether the first subscription may be valid for communications with the first radio access network of the first operator may include operations, features, means, or instructions for determining that the UE may be associated with the first operator.

Some examples of the method, apparatuses, and non-transitory computer-readable medium described herein may further include operations, features, means, or instructions for determining whether the first subscription may be valid for communications with the first radio access network of the first operator may be based on the UE establishing communications with the first radio access network of the first operator.

Some examples of the method, apparatuses, and non-transitory computer-readable medium described herein may further include operations, features, means, or instructions for detecting that the second subscriber identification module card may have been inserted into the second card slot, where determining whether the first subscription may be valid for communications with the first radio access network of the first operator may be based on detecting that the second subscriber identification module card may have been inserted into the second card slot.

Some examples of the method, apparatuses, and non-transitory computer-readable medium described herein may further include operations, features, means, or instructions for determining that the first subscription may be invalid for communications with the first radio access network of the first operator, where the communicating in accordance with the second subscription associated with the second subscriber identification module card further includes and invalidating the second subscriber identification module card for communications.

In some examples of the method, apparatuses, and non-transitory computer-readable medium described herein, the first subscription may be invalid based on a condition of the first subscriber identification module card, a network condition, or that the first subscription may be inactive.

Some examples of the method, apparatuses, and non-transitory computer-readable medium described herein may further include operations, features, means, or instructions for determining that the first subscription may be valid for communications with the first radio access network of the first operator and validating the second subscriber identification module card for communications.

Some examples of the method, apparatuses, and non-transitory computer-readable medium described herein may further include operations, features, means, or instructions for outputting, at the UE, a notification associated with the second subscriber identification module card being invalidated.

In some examples of the method, apparatuses, and non-transitory computer-readable medium described herein, the second subscriber identification module card may be associated with a second operator different from the first operator.

DETAILED DESCRIPTION

Figure 1:
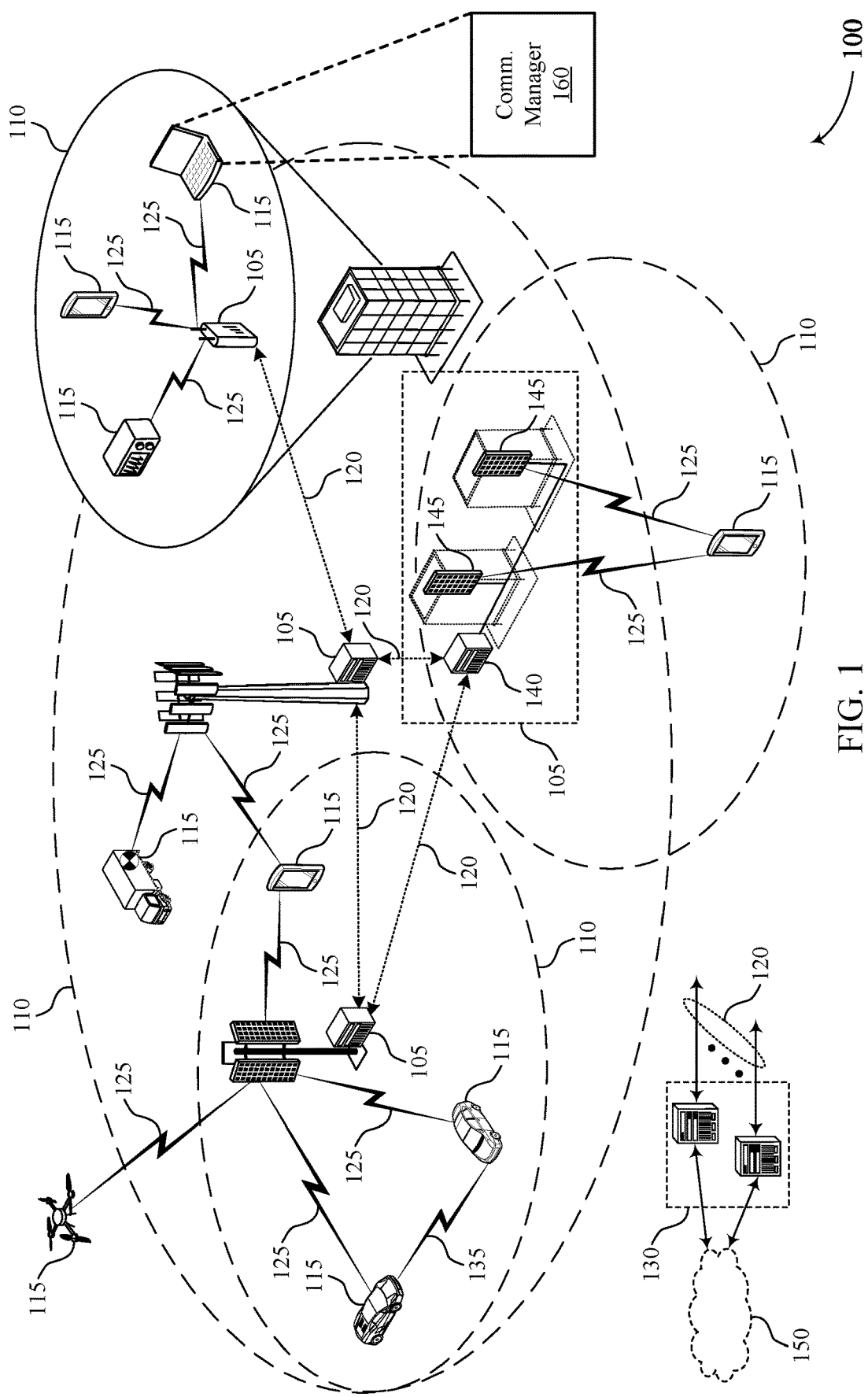
FIG. 1 illustrates an example of a wireless communications system that supports personalization on multi-subscriber identification module devices in accordance with aspects of the present disclosure.

A network operator or cellular provider (referred to herein as an "operator") may subsidize the cost of a UE (e.g., a cell phone, tablet, or other device) for a user. The subsidization of the UE may typically be through a promotion or if the user signs a contract for services (e.g., cellular phone services) with the operator. The user may receive a subscriber identification module (SIM) card from the operator for use with the UE. A SIM card may also be referred to as a subscriber identity module.

Some UEs contain more than one slot for SIM cards. A multi-SIM device may include a plurality of SIM card slots. If the UE is a multi-SIM UE, additional SIM cards may be inserted into the UE, some of which may be associated with different operators. For example, the user may use a second SIM card that is associated with a second operator that is different from the first operator. The second SIM card may be used to bypass the network of the first operator.

Techniques described herein may provide a way for an operator to invalidate a SIM card from another operator under certain circumstances. The UE may be under contract with a first operator for reasons including for cell phone services, because the purchase of the UE was subsidized by the first operator, UE is on a subscription plan between another UE and the first operator, or for other reasons. The first operator may determine whether the UE has a current and valid subscription to establish communications with a first radio access network using a first SIM card associated with the first operator. If so, any additional SIM card added to the UE that is associated with a different operator may communicate over the first radio access network because the user has a valid subscription for the first radio access network through the first operator. The UE may check the SIM cards, confirm with the radio access network that the first SIM card is valid for the radio access network, and then validate the second SIM card based on the first SIM card.

Conversely, the first operator may invalidate the second SIM card to operate on the radio access network, or any other radio access network, if the UE does not have a valid subscription with the first operator for the radio access network. That is, the second SIM card may not be used for any network that the UE is not already authorized to use via the first SIM card. This provides the first operator with a way to disable any other SIM card that may be used in the UE to bypass having a valid subscription with the first operator.

This technique may be performed whenever the UE is powered up, a new SIM card is added, a new network connection is established, or the like. The first SIM card may be valid when there is a current subscription for the network, when the first SIM card is working properly, when certain network conditions exists, when there are no overdue bills for the subscription, during the contract term, and the like.

If the second SIM card is invalidated, the UE may output a notification for the user detailing the invalidation. The notification may provide a link or other means for a user to validate the first SIM card, such as by activating a subscription with the first operator, paying any overdue bills, updating information, or the like. Once the subscription with the first operator becomes valid again, the second SIM card may be validated and enabled.

Aspects of the disclosure are initially described in the context of wireless communications systems. Aspects of the disclosure are further illustrated by and described with reference to process flows and a flowchart. Aspects of the disclosure are further illustrated by and described with reference to apparatus diagrams, system diagrams, and additional flowcharts that relate to personalization on multi-SIM devices.

FIG. 1 illustrates an example of a wireless communications system 100 that supports personalization on multi-SIM devices in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A UE 115 may be a multi-SIM device. That is, the UE 115 may include a plurality of SIM card slots, such as two, three, or four or more SIM card slots. For example, the UE 115 may be dual-SIM or triple-SIM. The UE 115 may use one or more SIM cards inserted into the SIM card slots to identify the UE 115 to one or more networks and to connect with the networks.

The UE 115 may include a communications manager 160, which may support personalization of multi-SIM devices. The communications manager 160 may identify that the UE includes a first SIM card associated with a first operator, the first SIM card being in a first card slot of a plurality of card slots of the UE and associated with a first subscription for which use of the UE is subject to a contractual obligation to the first operator. The communications manager 160 may determine that the UE is in communication with a first radio access network of the first operator. The communications manager 160 may also communicate in accordance with a second subscription associated with a second SIM card in a second card slot of the plurality of card slots, the communicating allowed based at least in part on the first SIM card associated with the first operator being in the first card slot and the UE being in communication with the first radio access network.

The techniques described herein prevent a UE 115 from bypassing a contract with a first operator by connecting to a network through a second operator. The techniques described herein improve compliance with legal contracts, improve network efficiency, and improve user experience.

Figure 2:
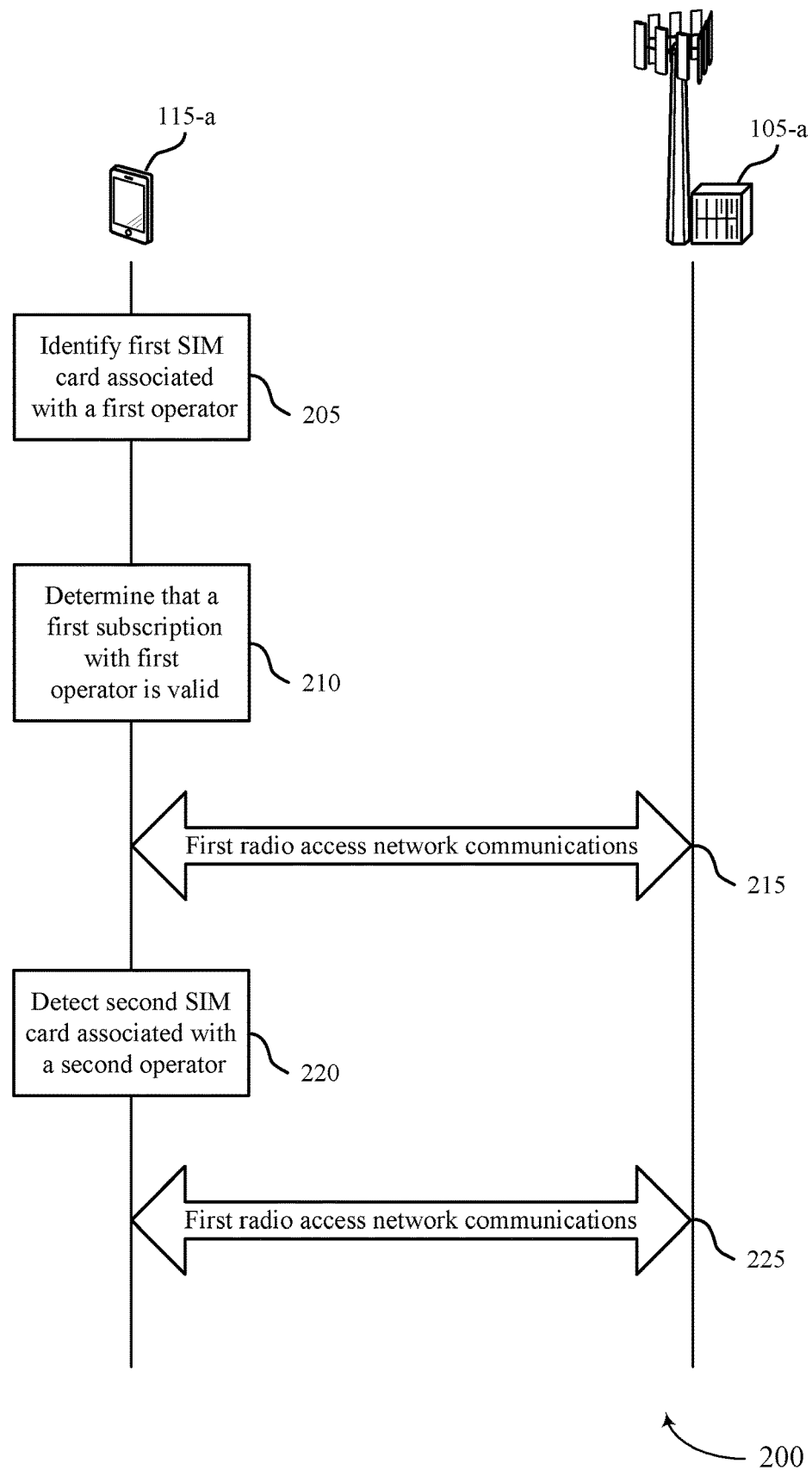
FIG. 2 illustrates an example of a process flow that supports personalization on multi-subscriber identification module devices in accordance with aspects of the present disclosure.

FIG. 2 illustrates an example of a process flow 200 that supports personalization on multi-SIM devices in accordance with aspects of the present disclosure. The process flow 200 supports techniques for validating network connections of a second SIM card via a status of a first SIM card. In some examples, the process flow 200 may implement aspects of the wireless communications system 100. For example, the process flow 200 may illustrate identifying a first SIM card, validating a first subscription with a first operator associated with the first SIM card, communicating with a first radio access network based on the first subscription, detecting a second SIM card associated with a second operator, and validating the second SIM card to connect with the first radio access network based on the validity of the first subscription, as described with reference to FIG. 1. The process flow 200 may include a base station 105-*a* that may be an example of aspects of a base station 105 as described herein. The process flow 200 may also include a UE 115-*a* that may be an example of aspects of a UE 115 as described herein. In some examples, the UE 115-*a* may be a multi-SIM device.

In the example of FIG. 2, the UE 115-*a* is described as a 5G capable multi-SIM device. In other examples, the UE 115-*a* may support other types of radio access technologies. An operator may provide a SIM card that can be used in the UE 115-*a* to provide network access. As used herein, an operator may be a cellular provider, a phone carrier, a wireless carrier, a mobile network operator, an Internet service provider, a virtual network operator, or the like.

When an operator subsidizes (e.g., gives subsidy to) a 5G capable device, the operator may intend the device to be used on the operator's 5G network, if at all. The first operator may provide the user of the UE 115-*a* with a SIM card that identifies the UE 115-*a* and contains other information to enable the UE 115-*a* to connect to a network of the first operator. For example, if a first operator subsidizes the UE 115-*a*, the first operator may intend the UE 115-*a* to connect to the 5G network of the first operator and not the 5G network of another operator. However, by adding a second SIM card associated with a different operator, the UE 115-*a* may be able to connect to a radio access technology that is not authorized by the first operator. Techniques described herein may prevent such connections.

For example, a user may purchase a subsidized multi-SIM UE 115-*a* from a first operator, sign an exclusive contract with first operator, and receive a SIM card from the first operator. In this example, the SIM card is enabled for 3G and 4G, but not for 5G. That is, the user may have signed a contract with the first operator for 3G and 4G services. The user may then add a second SIM card from a second operator to the UE 115-*a*, which may be enabled for 5G. The user may try to use the 5G network of the second operator via the second SIM card. This would enable the user to bypass the contract with the first operator, by connecting the UE 115-*a* to 5G without having a valid subscription for 5G with the first operator. In these circumstances, the first operator may lose business for 5G, even though it subsidized the UE 115-*a*.

Techniques described herein provide a way for the first operator to invalidate, or disable, connection to a network or radio access technology that is not part of the user's subscription with the first operator. For example, if the user has a valid contract in place for 3G and 4G services only with the first operator, then the first operator can prevent the UE 115-*a* from connecting to other services that are not included in the subscription, such as 5G, 2G, or the like. For example, the first operator may prevent the UE 115-*a* from using competitors' services to access networks other than 3G and 4G. The techniques described herein provide a way to restrict or control camping on networks with other operators' SIM cards.

Turning to FIG. 2, at 205, the UE 115-*a* may identify a first SIM card that has been inserted into one of the SIM card slots of the multi-SIM UE 115-*a*. The UE 115-*a* may determine that the first SIM card is associated with a first operator. The UE 115-*a* may determine that the first SIM card is associated with the first operator by receiving information from the base station 105-*a*. The UE 115-*a* may establish a connection with the base station 105-*a* and exchange information stored on the first SIM card. In some examples, the first SIM card may only work with the UE 115-*a*.

The UE 115-*a* may query the network, via the base station 105-*a*, to determine a subscription status of the first SIM card. At 210, the UE 115-*a* may determine that a subscription with the first operator is valid. In some examples, the base station 105-*a* may determine the subscription status of the first SIM card. As used herein, a subscription may be any agreement where the subscriber or user receives access to a product or service. For example, a subscription may be an agreement the user enters into with the first operator to provide network access for a fee, which may or may not be recurring. In some examples, the subscription may not have a fee attached.

A valid subscription may include any subscription that is currently active, that is, that the terms of the agreement are currently met. An invalid subscription may be any subscription where the terms are not currently being met. An invalid subscription may also be referred to as an illegal subscription. For example, if the agreement requires the user to pay a monthly bill for network access, the subscription is valid if there is no overdue monthly bill. If there is an overdue monthly bill, the subscription may be illegal until the bill has been paid.

Other conditions may also make a subscription illegal or invalid. For example, the subscription may be invalid in certain geographical locations (e.g., when the UE 115-*a* is located outside of a region in which the first operator operates), at certain times of day (e.g., during peak hours), when a data limit has been exceeded, when a time period has been exceeded, when there is a breach of a term of the contract or agreement, or when certain network conditions exist (e.g., latency, congestion, emergency situations, etc.). Other restrictions may be used to determine when a subscription is invalid. For example, the first operator may offer a plan with a reduced fee if the user is willing to have limited access during times when the network is highly congested. If the UE 115-*a* attempts to access the network during a highly congested time, the subscription may be invalid for the duration of the high congestion. Thresholds may be used to determined congestion levels, latency, or the like.

In some examples, more than one condition may be used to determine whether a subscription is valid or invalid. A subscription may also be invalid if there is no current subscription. For example, a 5G subscription may be invalid if there is no subscription with the first operator for 5G, even if the user has a current subscription with the first operator for 3G and 4G.

Because the UE 115-*a* (or the base station 105-*a*) determined that the first subscription for a first radio access network with the first operator is valid at 210, the UE 115-*a* may connect to the radio access network. At 215, the UE 115-*a* may connect to the radio access network via the base station 105-*a*, in compliance with the first subscription.

At 220, the UE 115-*a* may detect that a second SIM card has been inserted into the UE 115-*a*. The UE 115-*a* may determine that the second SIM card is associated with a second operator that is different from the first operator. The first operator, via the first radio access network and the UE 115-*a*, may invalidate any radio access technology that the second operator has enabled that does not have a valid subscription with the first operator. Likewise, the first operator may validate, or authorize, a connection to a radio access technology using the second SIM card that has a valid subscription with the first operator. For example, if the user has a valid subscription with the first operator for only 3G and 4G, the first operator may validate a connection to 3G and 4G networks using the second SIM card. The first operator, via the UE 115-*a*, may invalidate any other connection besides 3G and 4G that the second SIM card is capable of supporting, such as 5G.

Because the first operator has subsidized the purchase of the UE 115-*a*, the first operator may like to keep the subscriber on their own network for a term, such as for a year or two. During that contract duration, the subscriber may be limited to only accessing network types that are under contract with the first operator when accessing networks with the UE 115-*a*. After the term has expired, the first operator may make the UE 115-*a* open market, wherein the techniques described herein may be modified or terminated. These techniques may improve network efficiency by not allowing invalid connections to the network. That is, the first operator may not allow the second operator to camp on the first operator's networks.

Figure 3:
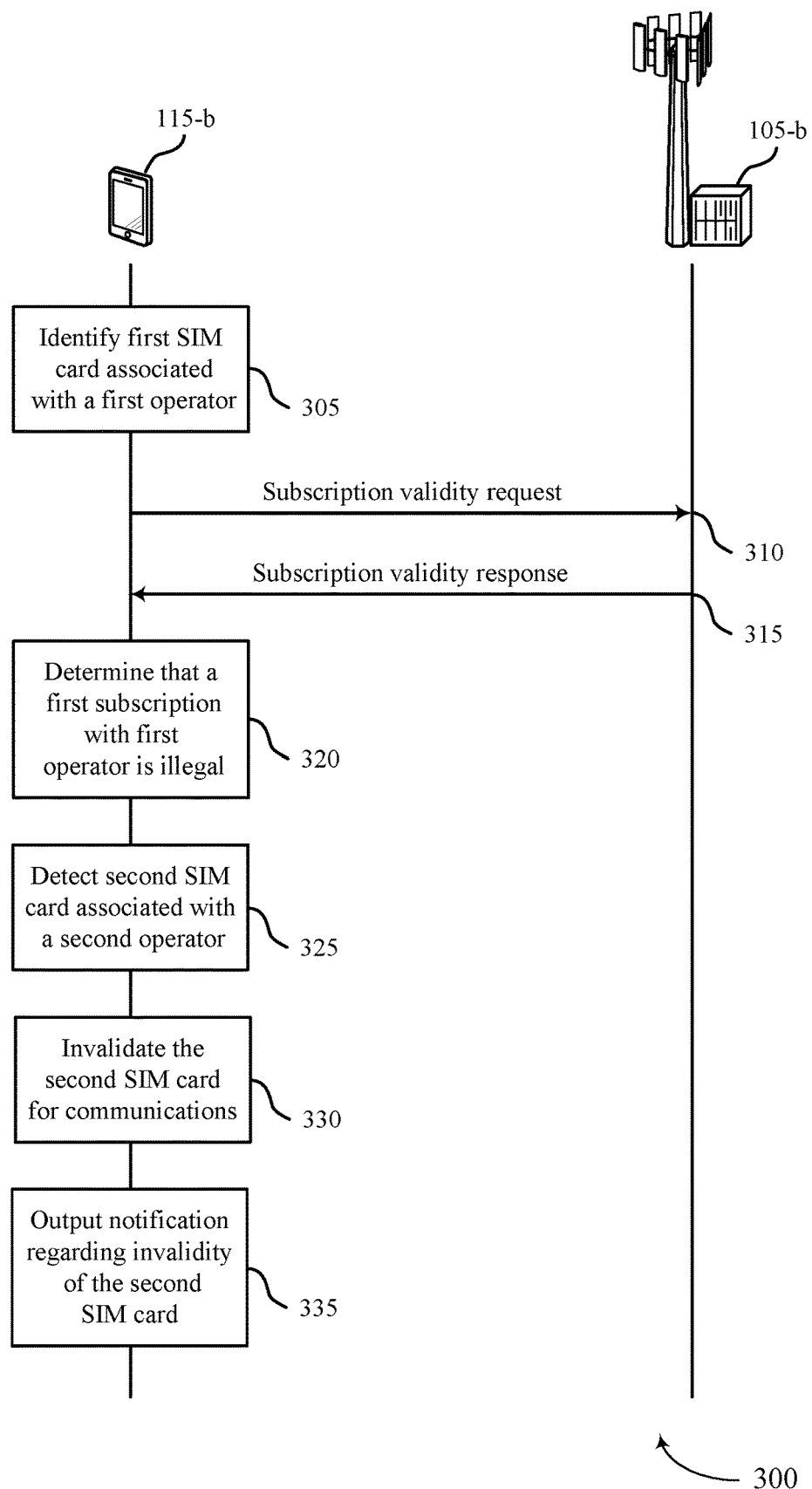
FIG. 3 illustrates an example of a process flow that supports personalization on multi-subscriber identification module devices in accordance with aspects of the present disclosure.

FIG. 3 illustrates an example of a process flow 300 that supports personalization on multi-SIM devices in accordance with aspects of the present disclosure. The process flow 300 supports techniques for validating network connections of a second SIM card via a status of a first SIM card. In some examples, the process flow 300 may implement aspects of the wireless communications system 100. The process flow 300 may include a base station 105-*b* that may be an example of aspects of a base station 105 as described herein. The process flow 300 may also include a UE 115-*b* that may be an example of aspects of a UE 115 as described herein. In some examples, the UE 115-*b* may be a multi-SIM device.

FIG. 3 illustrates an example where a first operator determines that a subscription with the first operator is invalid or illegal. At 305, the UE 115-*b* identifies a first SIM card associated with the first operator. This may be determined anytime the UE 115-*b* may connect to a network, such as upon power-up of the UE 115-*b*, when airplane mode is turned off, or when a previous connection is lost. At 310, the UE 115-*b* may send a subscription validity request to the base station 105-*b*. The base station 105-*b* may use information from the first SIM card to determine the identity of the first operator and the UE 115-*b*. The base station 105-*b* may query the first operator to determine whether there is a valid subscription for one or more radio access networks with the first operator.

In this example, the base station 105-*b* may determine that there is no valid subscription (e.g., subscription illegal) and send an indication of such in a subscription validity response 315. The UE 115-*b* may receive the subscription validity response 315 and determine that a first subscription with the first operator is invalid or illegal at 320. Therefore, the UE 115-*b* may not be allowed to connect to a radio access network of the first operator. The UE 115-*b* may mark the other SIM card slots as invalid. However, in some examples, the UE 115-*b* may be enabled to connect to the radio access network of the first operator for limited purposes, such as for emergency calls or to generate a valid subscription.

At 325, the UE 115-*b* may detect that a second SIM card has been inserted into the UE 115-*b*. The UE 115-*b* may determine that the second SIM card is associated with a second operator that is different from the first operator. At 330, the first operator, via the first radio access network and the UE 115-*b*, may invalidate the second SIM card for communications. For example, the second SIM card may not be able to be used for any radio access technology that the second operator has enabled that does not have a valid subscription with the first operator.

At 335, the UE 115-*b* may output a notification, such as a sound or graphical user interface, that indicates that the second SIM card is disabled or that there is no valid subscription with the first operator. The notification may indicate why there is not a valid subscription, such as the bill is overdue. The notification may provide a way for the user to create a valid subscription. For example, the notification may include a link that allows the user to pay an overdue bill. If the subscription becomes valid, the UE 115-*b* may enable the second SIM card as described herein.

Figure 4:
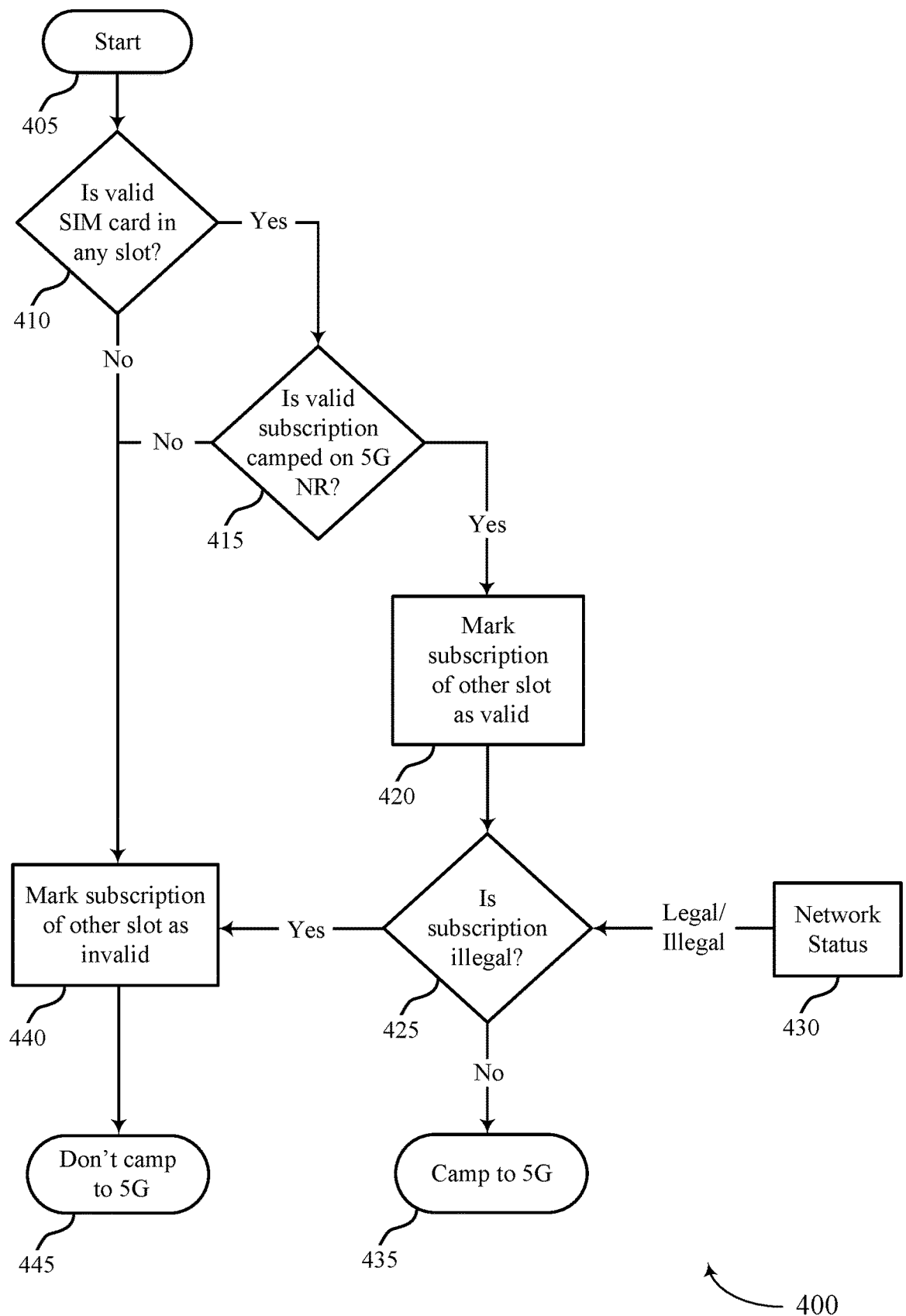
FIG. 4 illustrates an example of a flowchart that supports personalization on multi-subscriber identification module devices in accordance with aspects of the present disclosure.

FIG. 4 illustrates an example of a flowchart 400 that supports personalization on multi-SIM devices in accordance with aspects of the present disclosure. The flowchart 400 may support techniques for validating network connections of a second SIM card via a status of a first SIM card. In some examples, the flowchart 400 may implement aspects of the wireless communications system 100. The operations of the flowchart 400 may be implemented by a UE or its components as described herein. For example, the operations of the flowchart 400 may be performed by a UE 115 as described with reference to FIGS. 1 through 3 and 5 through 8. In some examples, a UE may execute a set of instructions to control the functional elements of the UE to perform the described functions. Additionally, or alternatively, the UE may perform aspects of the described functions using special-purpose hardware.

The flowchart 400 may begin at 405. At 410, the multi-SIM UE may determine whether there is a SIM card with a valid subscription in any slot of the UE. This determines whether there is a valid SIM card that is inserted in the UE. A SIM card may be valid if it is associated with an operator that subsidized the phone. The UE may determine this by comparing files from the SIM card with pre-configured files on the UE. In other examples, the UE may determine this from information received via a network connection. If there is no SIM card associated with the first operator (e.g., the operator who subsidized the UE), then the flowchart may proceed to 440. At 440, the UE may mark the subscription of any other SIM card in any other slot as invalid. In some examples, the UE may disable the other SIM card slots when there is no valid subscription with the first operator. At 445, the UE may not allow the second SIM card to camp on any network, such as a 5G network.

If there is a SIM card with the first operator, the flowchart 400 may proceed to 415. At 415, the UE may specifically determine whether the first operator has a valid subscription to connect to, or camp on, a 5G NR network. In other examples, other types of networks may be checked. If not, the flowchart 400 proceeds to 440 as described above. There may be triggers that make a particular subscription on a UE illegal. The trigger may come from the network to the UE because the UE is already connected to the network and camped at 415. The trigger may be a dynamic trigger that comes from the network to take an action to mark the subscription as illegal. If there is a valid subscription, the flowchart 400 may proceed to 420.

At 420, the UE may mark the subscription of other slots as valid. However, at 425, the UE may determine whether there is an illegal subscription. The UE may receive an indication of whether the subscription is legal or illegal from a network status check at 430. The network status check may be performed by another device on the network.

If the subscription is illegal, the flowchart 400 proceeds to 440 as described above and the subscription of any other SIM cards are marked as invalid. However, if the subscription is legal, the flowchart 400 proceeds to 435, and the second SIM card is allowed to be used to camp on the 5G network.

The UE may repeat the flowchart 400 whenever it is indicated, such as if the UE reconnects to a network after a connection loss, powering down, or being in airplane mode. The UE may also repeat the flowchart 400 whenever a new SIM card is inserted or when a subscription is marked by a network as valid or invalid.

Figure 5:
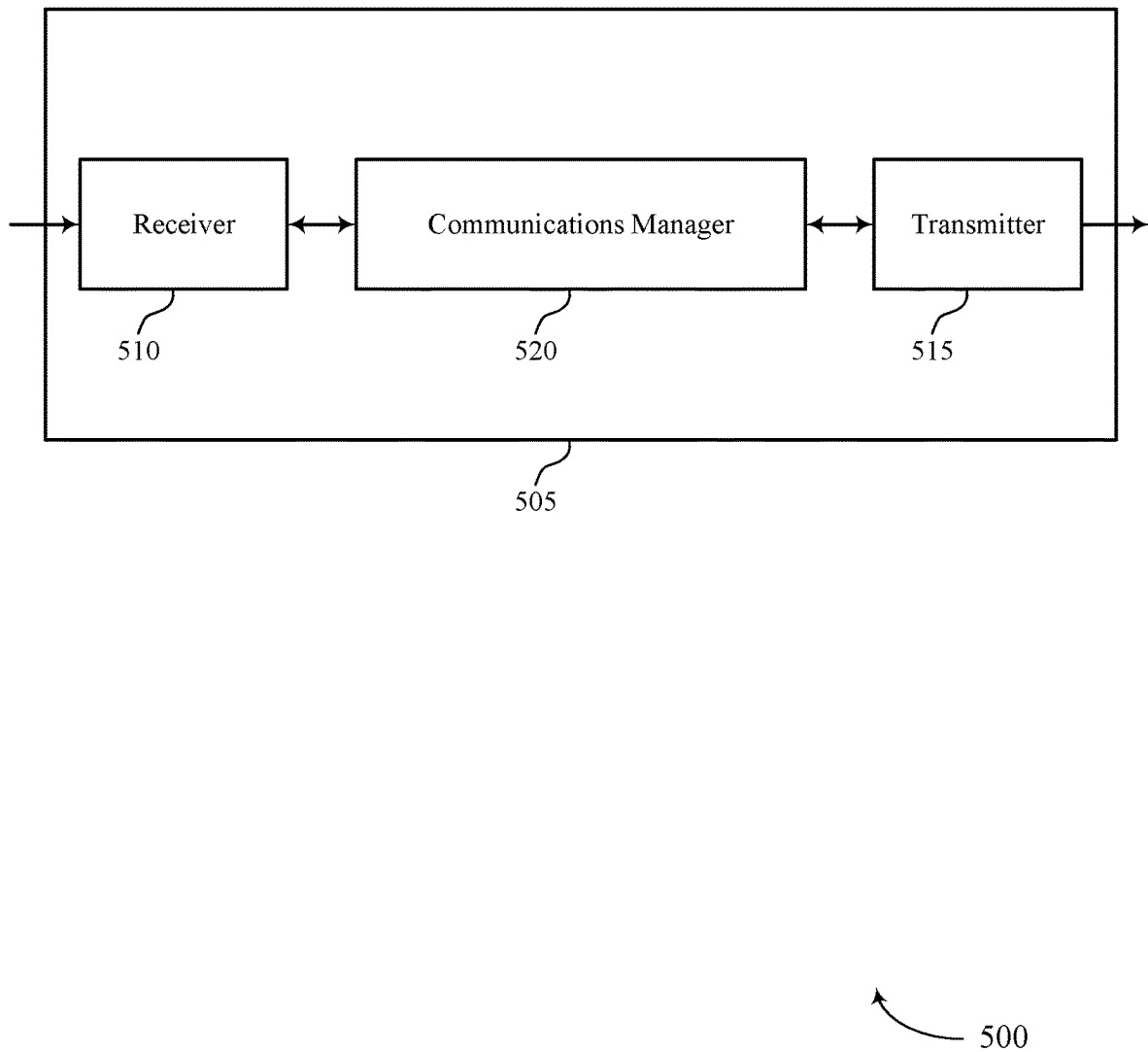
FIGS. 5 and 6 show block diagrams of devices that support personalization on multi-subscriber identification module devices in accordance with aspects of the present disclosure.

FIG. 5 shows a block diagram 500 of a device 505 that supports personalization on multi-SIM devices in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to personalization on multi-SIM devices). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to personalization on multi-SIM devices). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of personalization on multi-SIM devices as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for identifying that the UE includes a first SIM card associated with a first operator, the first SIM card being in a first card slot of a set of multiple card slots of the UE and associated with a first subscription for which use of the UE is subject to a contractual obligation to the first operator. The communications manager 520 may be configured as or otherwise support a means for determining that the UE is in communication with a first radio access network of the first operator. The communications manager 520 may be configured as or otherwise support a means for communicating in accordance with a second subscription associated with a second SIM card in a second card slot of the set of multiple card slots, the communicating allowed based on the first SIM card associated with the first operator being in the first card slot and the UE being in communication with the first radio access network.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reducing processing requirements, reducing power consumption, and more efficient utilization of communication resources.

Figure 6:
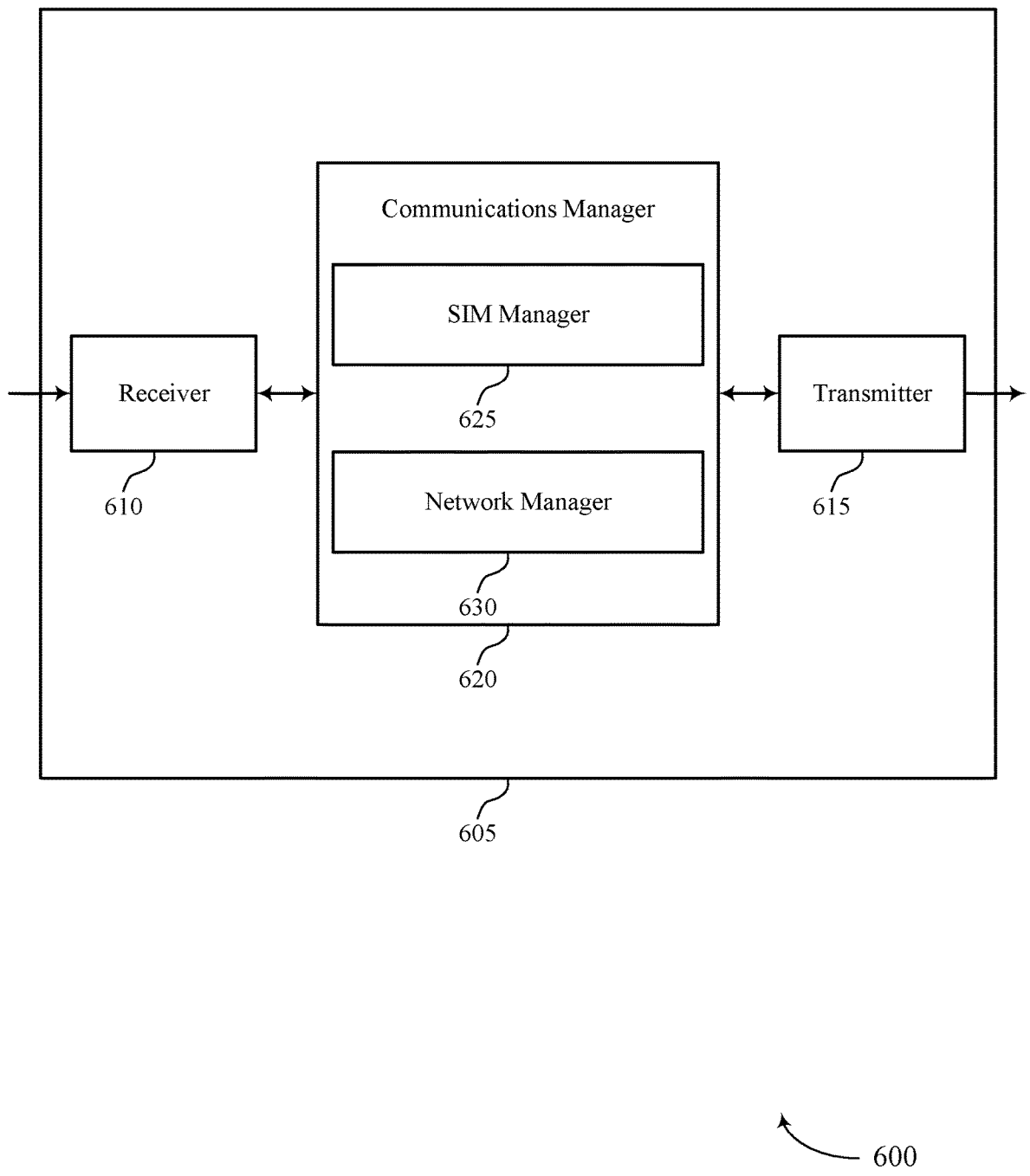

FIG. 6 shows a block diagram 600 of a device 605 that supports personalization on multi-SIM devices in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to personalization on multi-SIM devices). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, and information channels related to personalization on multi-SIM devices). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of personalization on multi-SIM devices as described herein. For example, the communications manager 620 may include an SIM manager 625 a network manager 630, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The SIM manager 625 may be configured as or otherwise support a means for identifying that the UE includes a first SIM card associated with a first operator, the first SIM card being in a first card slot of a set of multiple card slots of the UE and associated with a first subscription for which use of the UE is subject to a contractual obligation to the first operator. The network manager 630 may be configured as or otherwise support a means for determining that the UE is in communication with a first radio access network of the first operator. The network manager 630 may be configured as or otherwise support a means for communicating in accordance with a second subscription associated with a second SIM card in a second card slot of the set of multiple card slots, the communicating allowed based on the first SIM card associated with the first operator being in the first card slot and the UE being in communication with the first radio access network.

Figure 7:
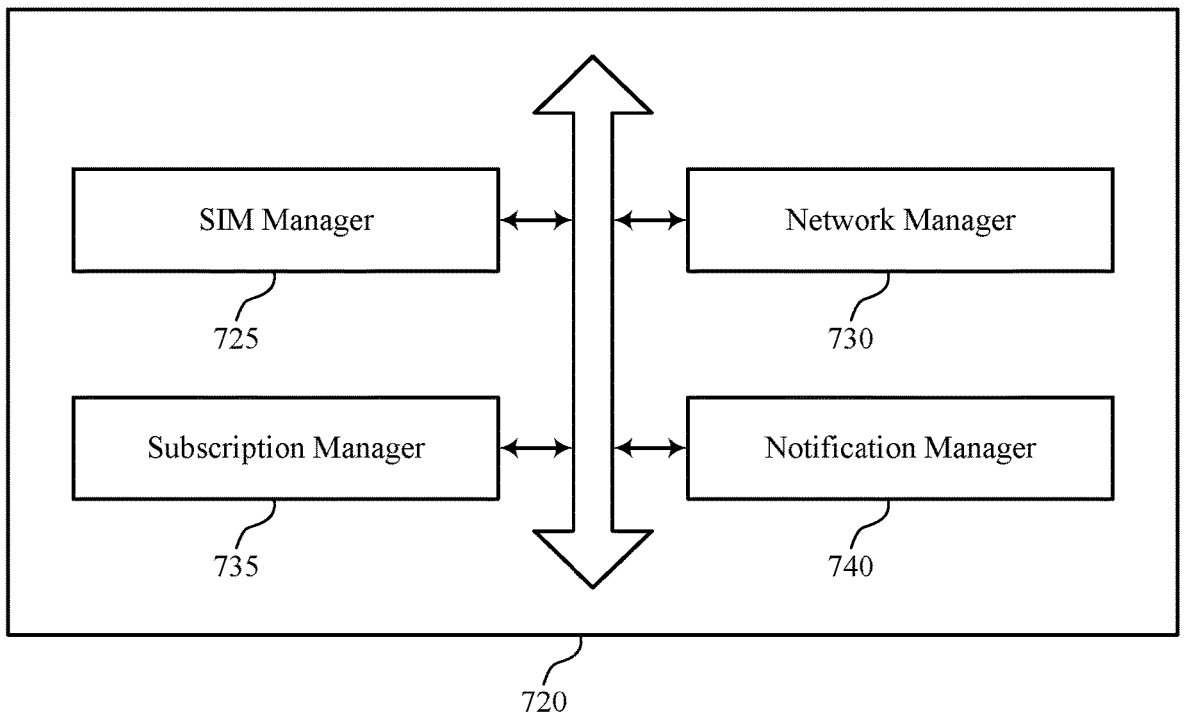
FIG. 7 shows a block diagram of a communications manager that supports personalization on multi-subscriber identification module devices in accordance with aspects of the present disclosure.

FIG. 7 shows a block diagram 700 of a communications manager 720 that supports personalization on multi-SIM devices in accordance with aspects of the present disclosure. The communications manager 720 may be an example of aspects of a communications manager 520, a communications manager 620, or both, as described herein. The communications manager 720, or various components thereof, may be an example of means for performing various aspects of personalization on multi-SIM devices as described herein. For example, the communications manager 720 may include an SIM manager 725, a network manager 730, a subscription manager 735, a notification manager 740, or any combination thereof. Each of these components may communicate, directly or indirectly, with one another (e.g., via one or more buses).

The communications manager 720 may support wireless communication at a UE in accordance with examples as disclosed herein. The SIM manager 725 may be configured as or otherwise support a means for identifying that the UE includes a first SIM card associated with a first operator, the first SIM card being in a first card slot of a set of multiple card slots of the UE and associated with a first subscription for which use of the UE is subject to a contractual obligation to the first operator. The network manager 730 may be configured as or otherwise support a means for determining that the UE is in communication with a first radio access network of the first operator. In some examples, the network manager 730 may be configured as or otherwise support a means for communicating in accordance with a second subscription associated with a second SIM card in a second card slot of the set of multiple card slots, the communicating allowed based on the first SIM card associated with the first operator being in the first card slot and the UE being in communication with the first radio access network.

In some examples, the subscription manager 735 may be configured as or otherwise support a means for determining whether the first subscription is valid for communications with the first radio access network of the first operator, where the communicating in accordance with the second subscription associated with the second SIM card is based on the first subscription being valid.

In some examples, to support determining whether the first subscription is valid for communications with the first radio access network of the first operator, the subscription manager 735 may be configured as or otherwise support a means for determining that the UE is associated with the first operator.

In some examples, determining whether the first subscription is valid for communications with the first radio access network of the first operator is based on the UE establishing communications with the first radio access network of the first operator.

In some examples, the SIM manager 725 may be configured as or otherwise support a means for detecting that the second SIM card has been inserted into the second card slot, where determining whether the first subscription is valid for communications with the first radio access network of the first operator is based on detecting that the second SIM card has been inserted into the second card slot.

In some examples, the subscription manager 735 may be configured as or otherwise support a means for determining that the first subscription is invalid for communications with the first radio access network of the first operator, where the communicating in accordance with the second subscription associated with the second SIM card further includes. In some examples, the network manager 730 may be configured as or otherwise support a means for invalidating the second SIM card for communications.

In some examples, the first subscription is invalid based on a condition of the first SIM card, a network condition, or that the first subscription is inactive.

In some examples, the subscription manager 735 may be configured as or otherwise support a means for determining that the first subscription is valid for communications with the first radio access network of the first operator. In some examples, the SIM manager 725 may be configured as or otherwise support a means for validating the second SIM card for communications.

In some examples, the notification manager 740 may be configured as or otherwise support a means for outputting, at the UE, a notification associated with the second SIM card being invalidated.

In some examples, the second SIM card is associated with a second operator different from the first operator.

Figure 8:
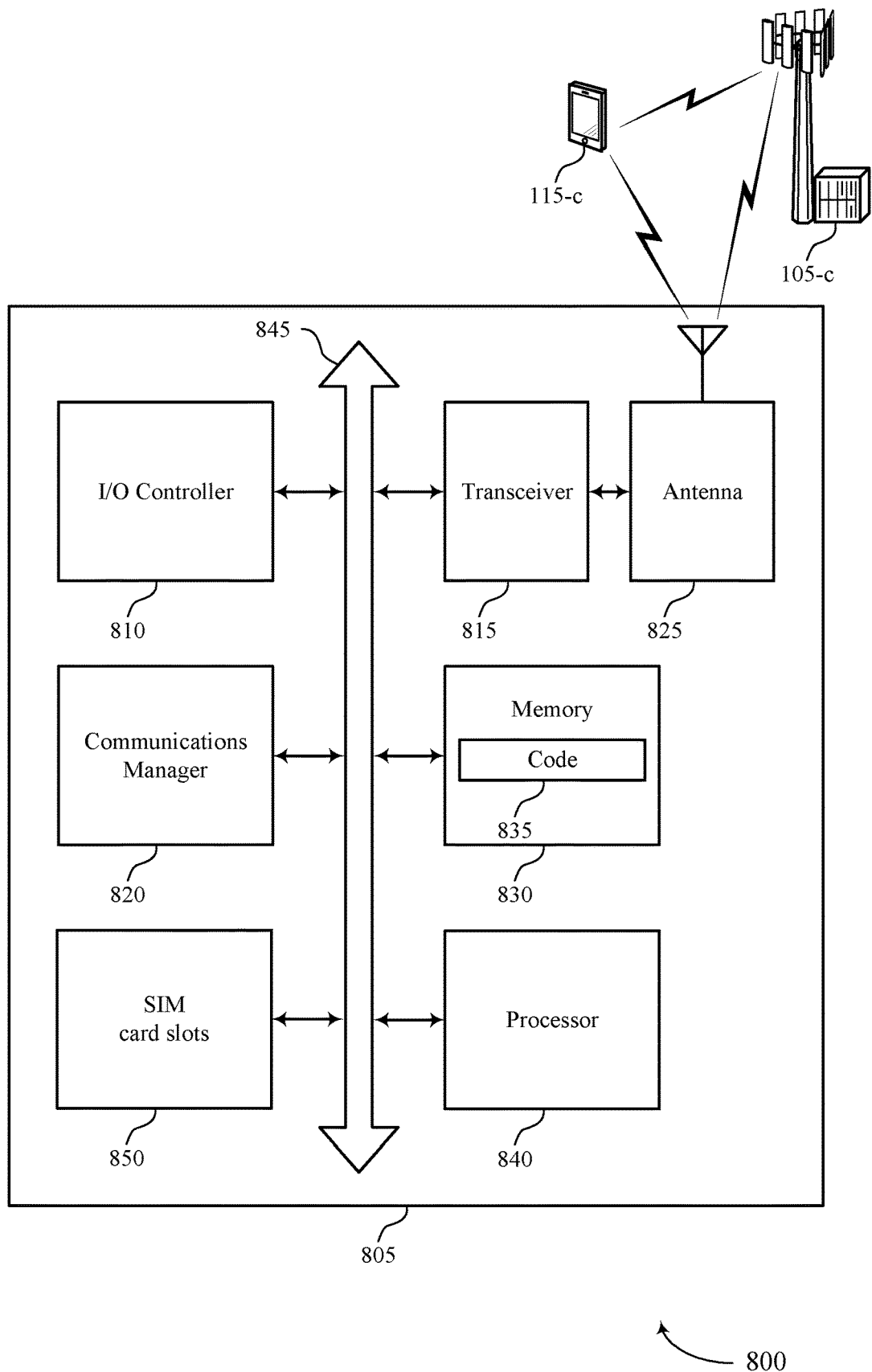
FIG. 8 shows a diagram of a system including a device that supports personalization on multi-subscriber identification module devices in accordance with aspects of the present disclosure.

FIG. 8 shows a diagram of a system 800 including a device 805 that supports personalization on multi-SIM devices in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, a processor 840, and SIM card slots 850. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting personalization on multi-SIM devices). For example, the device 805 or a component of the device 805 may include a processor 840 and memory 830 coupled to the processor 840, the processor 840 and memory 830 configured to perform various functions described herein.

The device 805 may include one or more SIM card slots 850. In some examples, the SIM card slots 850 include two SIM card slots. In other examples, the SIM card slots 850 include three or more SIM card slots.

The communications manager 820 may support wireless communication at a UE in accordance with examples as disclosed herein. For example, the communications manager 820 may be configured as or otherwise support a means for identifying that the UE includes a first SIM card associated with a first operator, the first SIM card being in a first card slot of a set of multiple card slots of the UE and associated with a first subscription for which use of the UE is subject to a contractual obligation to the first operator. The communications manager 820 may be configured as or otherwise support a means for determining that the UE is in communication with a first radio access network of the first operator. The communications manager 820 may be configured as or otherwise support a means for communicating in accordance with a second subscription associated with a second SIM card in a second card slot of the set of multiple card slots, the communicating allowed based on the first SIM card associated with the first operator being in the first card slot and the UE being in communication with the first radio access network.

By including or configuring the communications manager 820 in accordance with examples as described herein, the device 805 may support techniques for reducing processing requirements, reducing power consumption, improved user experience, and more efficient utilization of communication resources.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of personalization on multi-SIM devices as described herein, or the processor 840 and the memory 830 may be otherwise configured to perform or support such operations.

Figure 9:
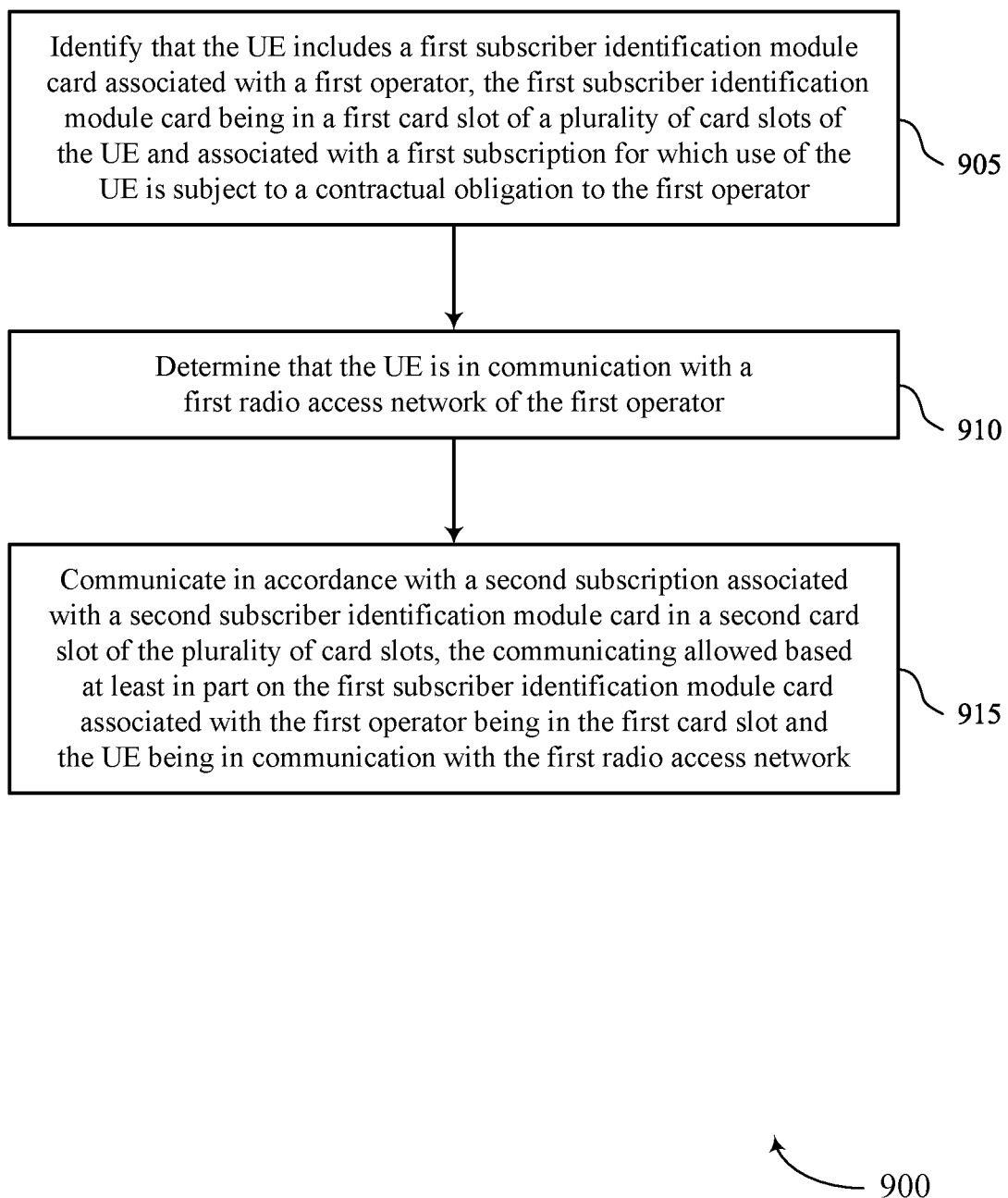
FIGS. 9 through 11 show flowcharts illustrating methods that support personalization on multi-subscriber identification module devices in accordance with aspects of the present disclosure.

FIG. 9 shows a flowchart illustrating a method 900 that supports personalization on multi-SIM devices in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 905, the method may include identifying that the UE includes a first SIM card associated with a first operator, the first SIM card being in a first card slot of a set of multiple card slots of the UE and associated with a first subscription for which use of the UE is subject to a contractual obligation to the first operator. The operations of 905 may be performed in accordance with examples as disclosed herein. In some examples, aspects of the operations of 905 may be performed by an SIM manager 725 as described with reference to FIG. 7.

At 910, the method may include determining that the UE is in communication with a first radio access network of the first operator. The operations of 910 may be performed in accordance with examples as disclosed herein. In some examples, aspects of the operations of 910 may be performed by a network manager 730 as described with reference to FIG. 7.

At 915, the method may include communicating in accordance with a second subscription associated with a second SIM card in a second card slot of the set of multiple card slots, the communicating allowed based on the first SIM card associated with the first operator being in the first card slot and the UE being in communication with the first radio access network. The operations of 915 may be performed in accordance with examples as disclosed herein. In some examples, aspects of the operations of 915 may be performed by a network manager 730 as described with reference to FIG. 7.

Figure 10:
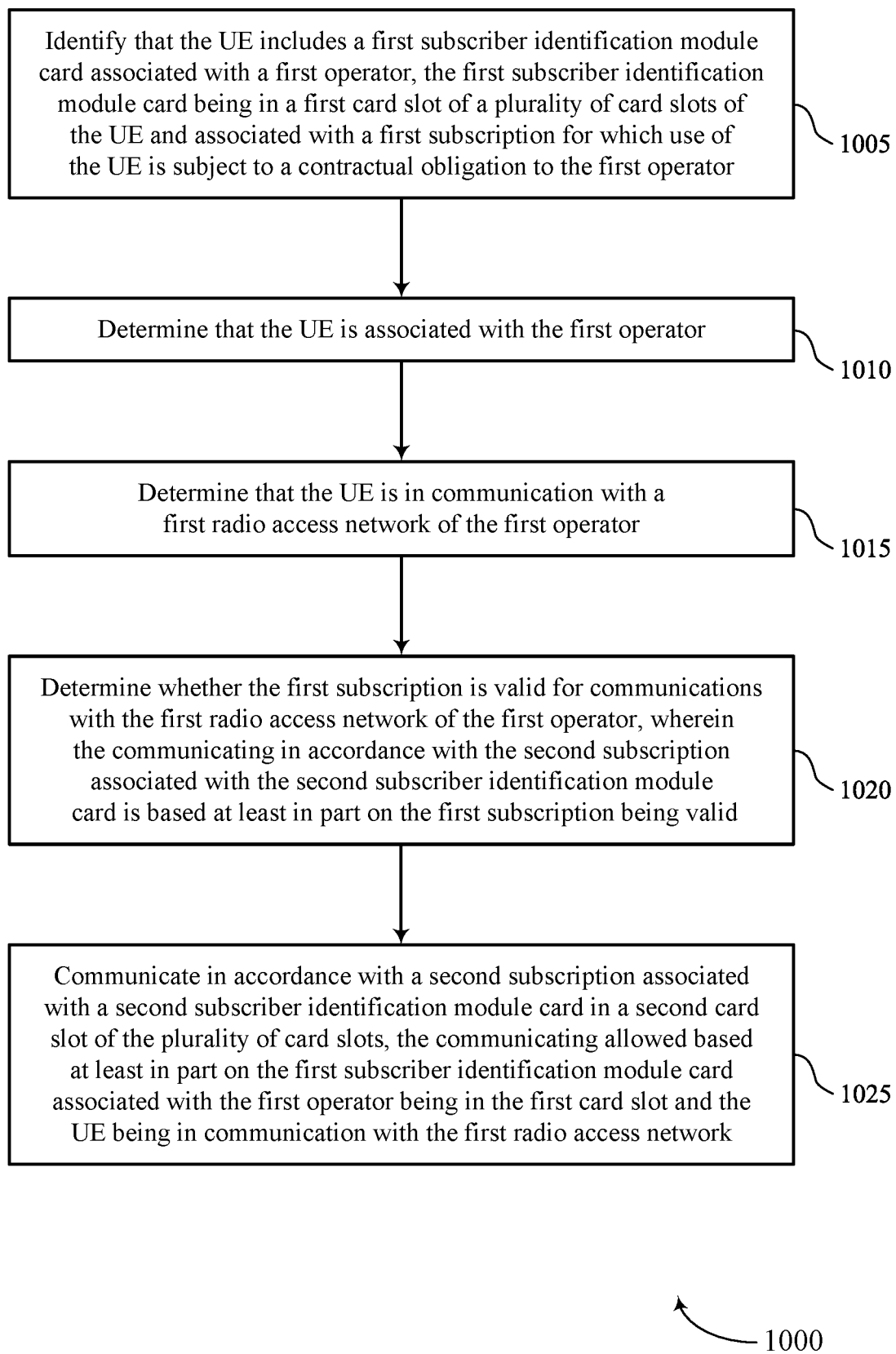

FIG. 10 shows a flowchart illustrating a method 1000 that supports personalization on multi-SIM devices in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1005, the method may include identifying that the UE includes a first SIM card associated with a first operator, the first SIM card being in a first card slot of a set of multiple card slots of the UE and associated with a first subscription for which use of the UE is subject to a contractual obligation to the first operator. The operations of 1005 may be performed in accordance with examples as disclosed herein. In some examples, aspects of the operations of 1005 may be performed by an SIM manager 725 as described with reference to FIG. 7.

At 1010, the method may include determining that the UE is associated with the first operator. The operations of 1010 may be performed in accordance with examples as disclosed herein. In some examples, aspects of the operations of 1010 may be performed by a subscription manager 735 as described with reference to FIG. 7.

At 1015, the method may include determining that the UE is in communication with a first radio access network of the first operator. The operations of 1015 may be performed in accordance with examples as disclosed herein. In some examples, aspects of the operations of 1015 may be performed by a network manager 730 as described with reference to FIG. 7.

At 1020, the method may include determining whether the first subscription is valid for communications with the first radio access network of the first operator, where the communicating in accordance with the second subscription associated with the second SIM card is based on the first subscription being valid. The operations of 1020 may be performed in accordance with examples as disclosed herein. In some examples, aspects of the operations of 1020 may be performed by a subscription manager 735 as described with reference to FIG. 7.

At 1025, the method may include communicating in accordance with a second subscription associated with a second SIM card in a second card slot of the set of multiple card slots, the communicating allowed based on the first SIM card associated with the first operator being in the first card slot and the UE being in communication with the first radio access network. The operations of 1025 may be performed in accordance with examples as disclosed herein. In some examples, aspects of the operations of 1025 may be performed by a network manager 730 as described with reference to FIG. 7.

Figure 11:
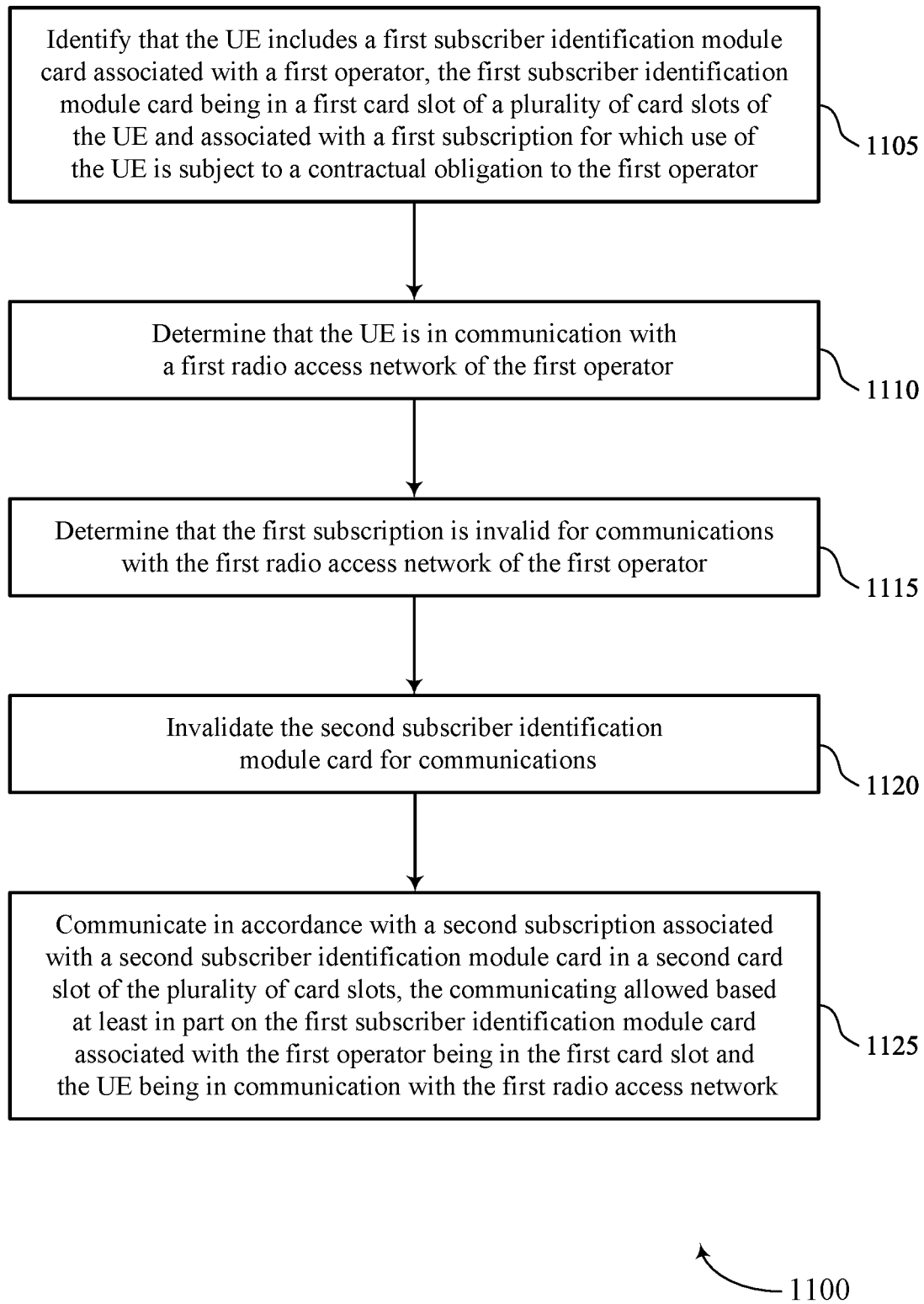

FIG. 11 shows a flowchart illustrating a method 1100 that supports personalization on multi-SIM devices in accordance with aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1105, the method may include identifying that the UE includes a first SIM card associated with a first operator, the first SIM card being in a first card slot of a set of multiple card slots of the UE and associated with a first subscription for which use of the UE is subject to a contractual obligation to the first operator. The operations of 1105 may be performed in accordance with examples as disclosed herein. In some examples, aspects of the operations of 1105 may be performed by an SIM manager 725 as described with reference to FIG. 7.

At 1110, the method may include determining that the UE is in communication with a first radio access network of the first operator. The operations of 1110 may be performed in accordance with examples as disclosed herein. In some examples, aspects of the operations of 1110 may be performed by a network manager 730 as described with reference to FIG. 7.

At 1115, the method may include determining that the first subscription is invalid for communications with the first radio access network of the first operator, where the communicating in accordance with the second subscription associated with the second SIM card further includes. The operations of 1115 may be performed in accordance with examples as disclosed herein. In some examples, aspects of the operations of 1115 may be performed by a subscription manager 735 as described with reference to FIG. 7.

At 1120, the method may include invalidating the second SIM card for communications. The operations of 1120 may be performed in accordance with examples as disclosed herein. In some examples, aspects of the operations of 1120 may be performed by a network manager 730 as described with reference to FIG. 7.

At 1125, the method may include communicating in accordance with a second subscription associated with a second SIM card in a second card slot of the set of multiple card slots, the communicating allowed based on the first SIM card associated with the first operator being in the first card slot and the UE being in communication with the first radio access network. In this example, the communicating is not allowed based on the first SIM card being invalidated. The operations of 1125 may be performed in accordance with examples as disclosed herein. In some examples, aspects of the operations of 1125 may be performed by a network manager 730 as described with reference to FIG. 7.

The following provides an overview of aspects of the present disclosure:

Aspect 1: A method for wireless communication at a UE, comprising: identifying that the UE includes a first subscriber identification module card associated with a first operator, the first subscriber identification module card being in a first card slot of a plurality of card slots of the UE and associated with a first subscription for which use of the UE is subject to a contractual obligation to the first operator; determining that the UE is in communication with a first radio access network of the first operator; and communicating in accordance with a second subscription associated with a second subscriber identification module card in a second card slot of the plurality of card slots, the communicating allowed based at least in part on the first subscriber identification module card associated with the first operator being in the first card slot and the UE being in communication with the first radio access network.

Aspect 2: The method of aspect 1, further comprising: determining whether the first subscription is valid for communications with the first radio access network of the first operator, wherein the communicating in accordance with the second subscription associated with the second subscriber identification module card is based at least in part on the first subscription being valid.

Aspect 3: The method of aspect 2, wherein determining whether the first subscription is valid for communications with the first radio access network of the first operator further comprises: determining that the UE is associated with the first operator.

Aspect 4: The method of any of aspects 2 through 3, wherein determining whether the first subscription is valid for communications with the first radio access network of the first operator is based at least in part on the UE establishing communications with the first radio access network of the first operator.

Aspect 5: The method of any of aspects 2 through 4, further comprising: detecting that the second subscriber identification module card has been inserted into the second card slot, wherein determining whether the first subscription is valid for communications with the first radio access network of the first operator is based at least in part on detecting that the second subscriber identification module card has been inserted into the second card slot.

Aspect 6: The method of any of aspects 2 through 5, further comprising: determining that the first subscription is invalid for communications with the first radio access network of the first operator, wherein the communicating in accordance with the second subscription associated with the second subscriber identification module card further comprises: invalidating the second subscriber identification module card for communications.

Aspect 7: The method of aspect 6, wherein the first subscription is invalid based at least in part on a condition of the first subscriber identification module card, a network condition, or that the first subscription is inactive.

Aspect 8: The method of any of aspects 6 through 7, further comprising: determining that the first subscription is valid for communications with the first radio access network of the first operator; and validating the second subscriber identification module card for communications.

Aspect 9: The method of any of aspects 6 through 8, further comprising: outputting, at the UE, a notification associated with the second subscriber identification module card being invalidated.

Aspect 10: The method of any of aspects 1 through 9, wherein the second subscriber identification module card is associated with a second operator different from the first operator.

Aspect 11: An apparatus for wireless communication at a UE, comprising a processor; memory coupled with the processor; and instructions stored in the memory and executable by the processor to cause the apparatus to perform a method of any of aspects 1 through 10.

Aspect 12: An apparatus for wireless communication at a UE, comprising at least one means for performing a method of any of aspects 1 through 10.

Aspect 13: A non-transitory computer-readable medium storing code for wireless communication at a UE, the code comprising instructions executable by a processor to perform a method of any of aspects 1 through 10.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:

identifying that the UE includes a first subscriber identification module card associated with a first operator, the first subscriber identification module card being in a first card slot of a plurality of card slots of the UE and associated with a first subscription for which use of the UE is subject to a contractual obligation to the first operator;

determining that the UE is in communication with a first radio access network of the first operator;

communicating in accordance with a second subscription associated with a second subscriber identification module card in a second card slot of the plurality of card slots, the communicating allowed based at least in part on the first subscriber identification module card associated with the first operator being in the first card slot and the UE being in communication with the first radio access network; and determining whether the first subscription is valid for communications with the first radio access network of the first operator, wherein the communicating in accordance with the second subscription associated with the second subscriber identification module card is based at least in part on the first subscription being valid.

2. The method of claim 1, wherein determining whether the first subscription is valid for communications with the first radio access network of the first operator further comprises:

determining that the UE is associated with the first operator.

3. The method of claim 1, wherein determining whether the first subscription is valid for communications with the first radio access network of the first operator is based at least in part on the UE establishing communications with the first radio access network of the first operator.

4. The method of claim 1, further comprising:
detecting that the second subscriber identification module card has been inserted into the second card slot, wherein determining whether the first subscription is valid for communications with the first radio access network of the first operator is based at least in part on detecting that the second subscriber identification module card has been inserted into the second card slot.

5. The method of claim 1, further comprising:
determining that the first subscription is invalid for communications with the first radio access network of the first operator, wherein the communicating in accordance with the second subscription associated with the second subscriber identification module card further comprises:
invalidating the second subscriber identification module card for communications.

6. The method of claim 5, wherein the first subscription is invalid based at least in part on a condition of the first subscriber identification module card, a network condition, or that the first subscription is inactive.

7. The method of claim 5, further comprising:
determining that the first subscription is valid for communications with the first radio access network of the first operator; and
validating the second subscriber identification module card for communications.

8. The method of claim 5, further comprising:
outputting, at the UE, a notification associated with the second subscriber identification module card being invalidated.

9. The method of claim 1, wherein the second subscriber identification module card is associated with a second operator different from the first operator.

10. An apparatus for wireless communication at a user equipment (UE), comprising:
a processor;
memory coupled with the processor; and
instructions stored in the memory and executable by the processor to cause the apparatus to:
identify that the UE includes a first subscriber identification module card associated with a first operator, the first subscriber identification module card being in a first card slot of a plurality of card slots of the UE and associated with a first subscription for which use of the UE is subject to a contractual obligation to the first operator;
determine that the UE is in communication with a first radio access network of the first operator; and
communicate in accordance with a second subscription associated with a second subscriber identification module card in a second card slot of the plurality of card slots, the communicating allowed based at least in part on the first subscriber identification module card associated with the first operator being in the first card slot and the UE being in communication with the first radio access network;
wherein the instructions are further executable by the processor to cause the apparatus to:
determine whether the first subscription is valid for communications with the first radio access network of the first operator, wherein the communicating in accordance with the second subscription associated with the second subscriber identification module card is based at least in part on the first subscription being valid.

11. The apparatus of claim 10, wherein the instructions to determine whether the first subscription is valid for communications with the first radio access network of the first operator are further executable by the processor to cause the apparatus to:
determine that the UE is associated with the first operator.

12. The apparatus of claim 10, wherein determining whether the first subscription is valid for communications with the first radio access network of the first operator is based at least in part on the UE establishing communications with the first radio access network of the first operator.

13. The apparatus of claim 10, wherein the instructions are further executable by the processor to cause the apparatus to:
detect that the second subscriber identification module card has been inserted into the second card slot, wherein determining whether the first subscription is valid for communications with the first radio access network of the first operator is based at least in part on detecting that the second subscriber identification module card has been inserted into the second card slot.

14. The apparatus of claim 10, wherein the instructions are further executable by the processor to cause the apparatus to:
determine that the first subscription is invalid for communications with the first radio access network of the first operator, wherein the communicating in accordance with the second subscription associated with the second subscriber identification module card further comprises: invalidate the second subscriber identification module card for communications.

15. The apparatus of claim 14, wherein the first subscription is invalid based at least in part on a condition of the first subscriber identification module card, a network condition, or that the first subscription is inactive.

16. The apparatus of claim 14, wherein the instructions are further executable by the processor to cause the apparatus to:
determine that the first subscription is valid for communications with the first radio access network of the first operator; and
validate the second subscriber identification module card for communications.

17. The apparatus of claim 14, wherein the instructions are further executable by the processor to cause the apparatus to:
output, at the UE, a notification associated with the second subscriber identification module card being invalidated.

18. The apparatus of claim 10, wherein the second subscriber identification module card is associated with a second operator different from the first operator.

19. An apparatus for wireless communication at a user equipment (UE), comprising:
means for identifying that the UE includes a first subscriber identification module card associated with a first operator, the first subscriber identification module card being in a first card slot of a plurality of card slots of the UE and associated with a first subscription for which use of the UE is subject to a contractual obligation to the first operator;
means for determining that the UE is in communication with a first radio access network of the first operator;

means for communicating in accordance with a second subscription associated with a second subscriber identification module card in a second card slot of the plurality of card slots, the communicating allowed based at least in part on the first subscriber identification module card associated with the first operator being in the first card slot and the UE being in communication with the first radio access network; and means for determining whether the first subscription is valid for communications with the first radio access network of the first operator, wherein the communicating in accordance with the second subscription associated with the second subscriber identification module card is based at least in part on the first subscription being valid.

20. The apparatus of claim 19, further comprising:

means for detecting that the second subscriber identification module card has been inserted into the second card slot, wherein determining whether the first subscription is valid for communications with the first radio access network of the first operator is based at least in part on detecting that the second subscriber identification module card has been inserted into the second card slot.

21. The apparatus of claim 19, further comprising:

means for determining that the first subscription is invalid for communications with the first radio access network of the first operator, wherein the communicating in accordance with the second subscription associated with the second subscriber identification module card further comprises:

means for invalidating the second subscriber identification module card for communications.

22. The apparatus of claim 21, further comprising:

means for determining that the first subscription is valid for communications with the first radio access network of the first operator; and means for validating the second subscriber identification module card for communications.

23. The apparatus of claim 21, further comprising:

means for outputting, at the UE, a notification associated with the second subscriber identification module card being invalidated.

24. A non-transitory computer-readable medium storing code for wireless communication at a user equipment (UE), the code comprising instructions executable by a processor to:

identify that the UE includes a first subscriber identification module card associated with a first operator, the first subscriber identification module card being in a first card slot of a plurality of card slots of the UE and associated with a first subscription for which use of the UE is subject to a contractual obligation to the first operator;

determine that the UE is in communication with a first radio access network of the first operator; and communicate in accordance with a second subscription associated with a second subscriber identification module card in a second card slot of the plurality of card slots, the communicating allowed based at least in part on the first subscriber identification module card associated with the first operator being in the first card slot and the UE being in communication with the first radio access network;

wherein the instructions are further executable by the processor to:

determine whether the first subscription is valid for communications with the first radio access network of the first operator, wherein the communicating in accordance with the second subscription associated with the second subscriber identification module card is based at least in part on the first subscription being valid.

25. The non-transitory computer-readable medium of claim 24, wherein the instructions are further executable by the processor to:

detect that the second subscriber identification module card has been inserted into the second card slot, wherein determining whether the first subscription is valid for communications with the first radio access network of the first operator is based at least in part on detecting that the second subscriber identification module card has been inserted into the second card slot.

26. The non-transitory computer-readable medium of claim 24, wherein the instructions are further executable by the processor to:

determine that the first subscription is invalid for communications with the first radio access network of the first operator, wherein the communicating in accordance with the second subscription associated with the second subscriber identification module card further comprises:

invalidate the second subscriber identification module card for communications.

\* \* \* \* \*